United States Patent [19]

Gurry

[11] 4,334,319

[45] Jun. 8, 1982

[54] BATTERY-POWERED RECEIVERS

[76] Inventor: George W. Gurry, 3 Highfield Close, Danbury, Essex, England

[21] Appl. No.: 89,261

[22] Filed: Oct. 26, 1979

[30] Foreign Application Priority Data

Oct. 27, 1978 [GB] United Kingdom ............... 42201/78

[51] Int. Cl.³ ............................................. H04B 1/06
[52] U.S. Cl. .................................. 455/227; 455/343; 455/352; 340/825.72; 340/311.1; 340/825.48
[58] Field of Search ..................................... 455/35–38, 455/227, 228, 231, 343, 352; 340/171 R, 171 PF, 167 A, 694, 309.1, 311

[56] References Cited

U.S. PATENT DOCUMENTS

| | | | |
|---|---|---|---|
| 2,912,574 | 11/1959 | Gensel | 455/343 |
| 3,238,503 | 3/1966 | Ultermark et al. | 455/36 |
| 3,337,805 | 8/1967 | Joseph | 455/228 |
| 3,355,709 | 11/1967 | Hanus | 455/36 |
| 3,509,361 | 4/1970 | Yello | 455/231 |
| 3,694,755 | 9/1972 | Ward | 455/36 |
| 3,769,593 | 10/1973 | Williams | 455/227 |
| 3,890,592 | 6/1975 | Kitamura et al. | 455/352 |

*Primary Examiner*—Marc E. Bookbinder
*Attorney, Agent, or Firm*—Browdy and Neimark

[57] ABSTRACT

A battery-powered receiver having a switch for disconnecting the battery from radio frequency detection circuits within the receiver upon receipt of a sequence of coded address and command signals. Each address and command signal is a radio frequency modulated with an audio or tone frequency. A tone decoder within the receiver is sensitive to audio signals whose frequencies lie within any one of sixteen predetermined frequency ranges. Stored at the output of the decoder is an address code of two or more numbers representing tone frequencies, these numbers being representative of the particular receiver or group of receivers. A sequence of audio signals detected by the tone detector is compared with the stored address code. If the address signals are followed by a coded command signal, made up of a tone signal or sequence of tone signals, the tone detector gives an output which causes the battery switch to be opened for a time determined by the coding of the command signal.

3 Claims, 13 Drawing Figures

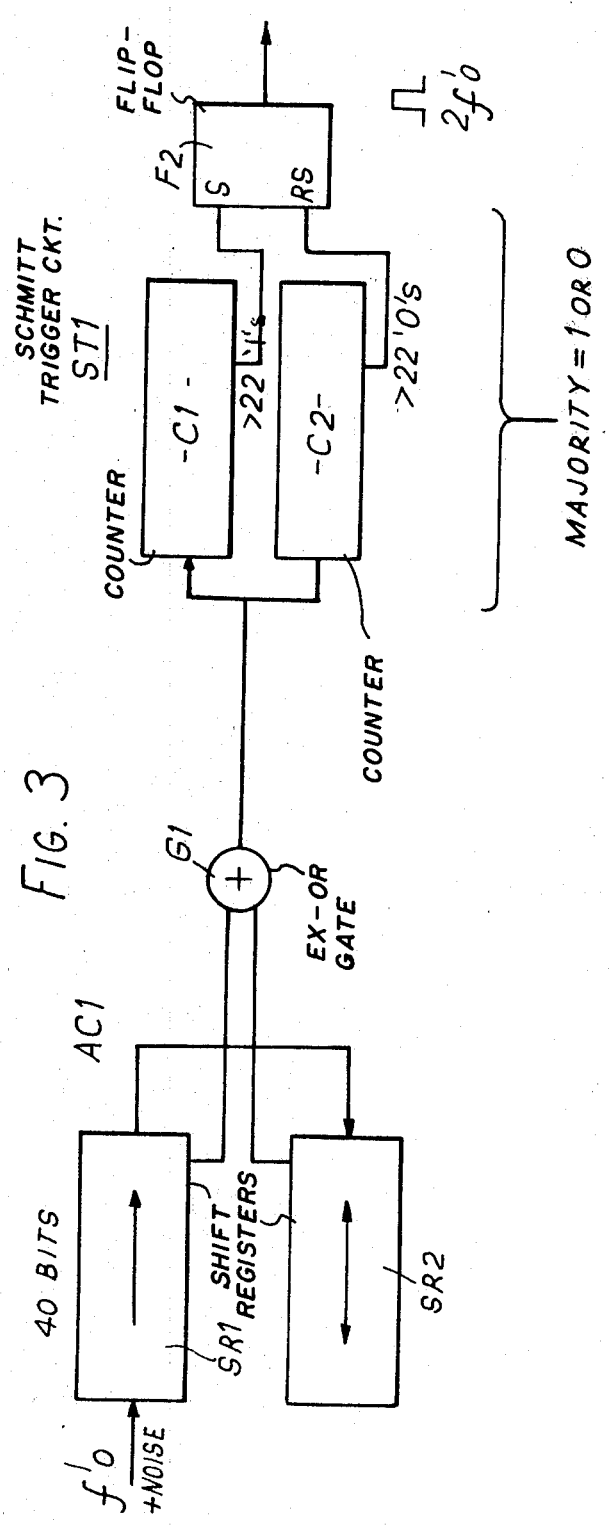

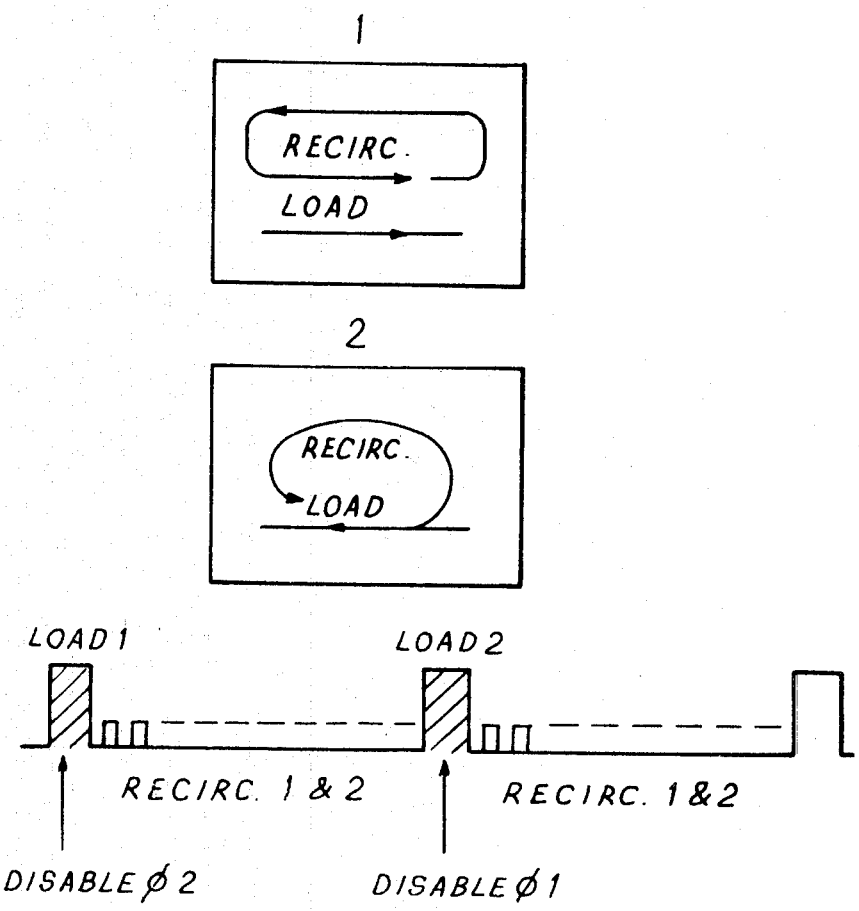

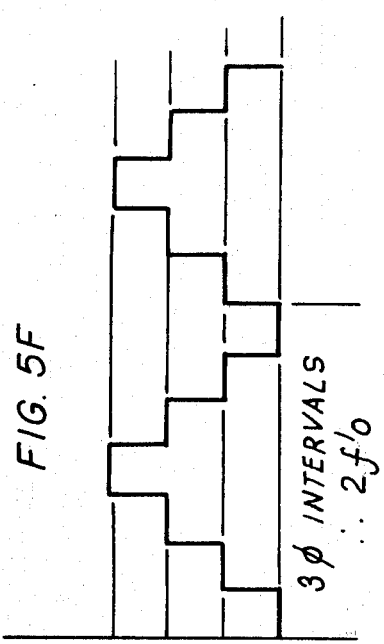
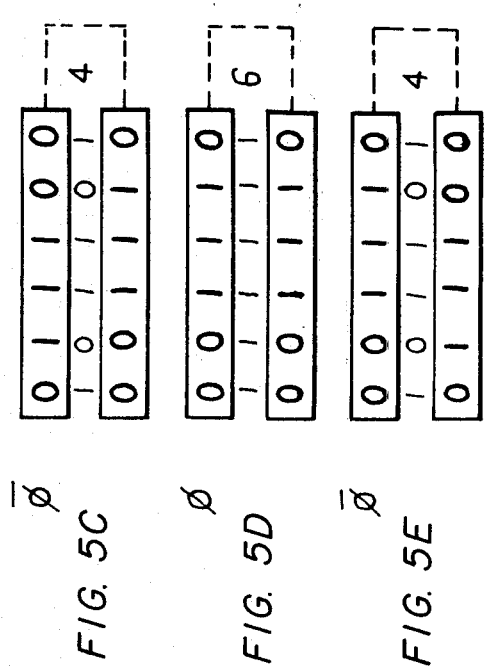
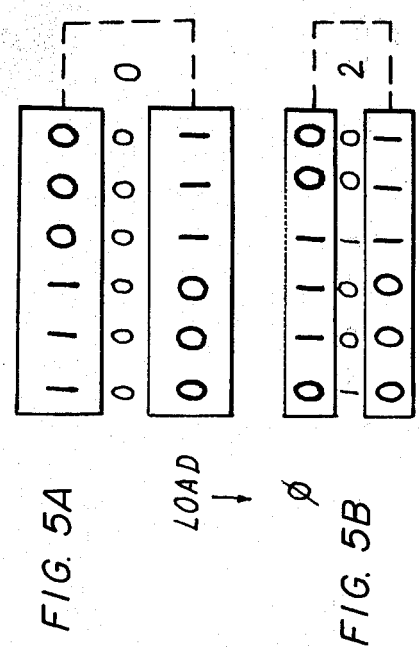

BATTERY-POWERED RECEIVERS

BRIEF DESCRIPTION OF INVENTION

This invention relates to battery-powered receivers.

According to the invention there is provided a battery-powered receiver comprising a tone decoder which is adapted to sense an incoming electromagnetic signal comprising a predetermined coded address signal followed by a coded command signal, the address signal comprising at least two tone signal which are transmitted sequentially and each of which comprises an electromagnetic signal having a frequency different from the frequency of the or each adjacent tone signal and the command signal comprising a tone signal which is an electromagnetic signal which can assume any one of at least two different predetermined frequencies, the tone decoder being adapted, upon sensing the incoming signal, to generate an output signal representative of the coded command signal, timing means, switching means for connection between a battery and other components in or associated with the receiver, means coupling the switching means to an output of the timing means, and means for applying the output signal from the decoder to the timing means, whereby the timing means generate an output which is applied to the switching means and causes the switching means to operate and disconnect the battery from at least one of the said components for a predetermined interval of time represented by the coded command signal.

A device according to the invention may be a two-way receiver transmitter or a non-portable battery-powered receiver-transmitter.

BRIEF DESCRIPTION OF FIGURES

FIGS. 1-3, 6, 7 are block schematic diagrams of tone decoder portions, which tone decoder is shown as a part of FIG. 8.

FIG. 4 illustrates an operational aspect of the tone decoder.

FIGS. 5A-5F illustrate another operational aspect of the tone decoder.

DETAILED DESCRIPTION OF THE INVENTION

Figure 8:
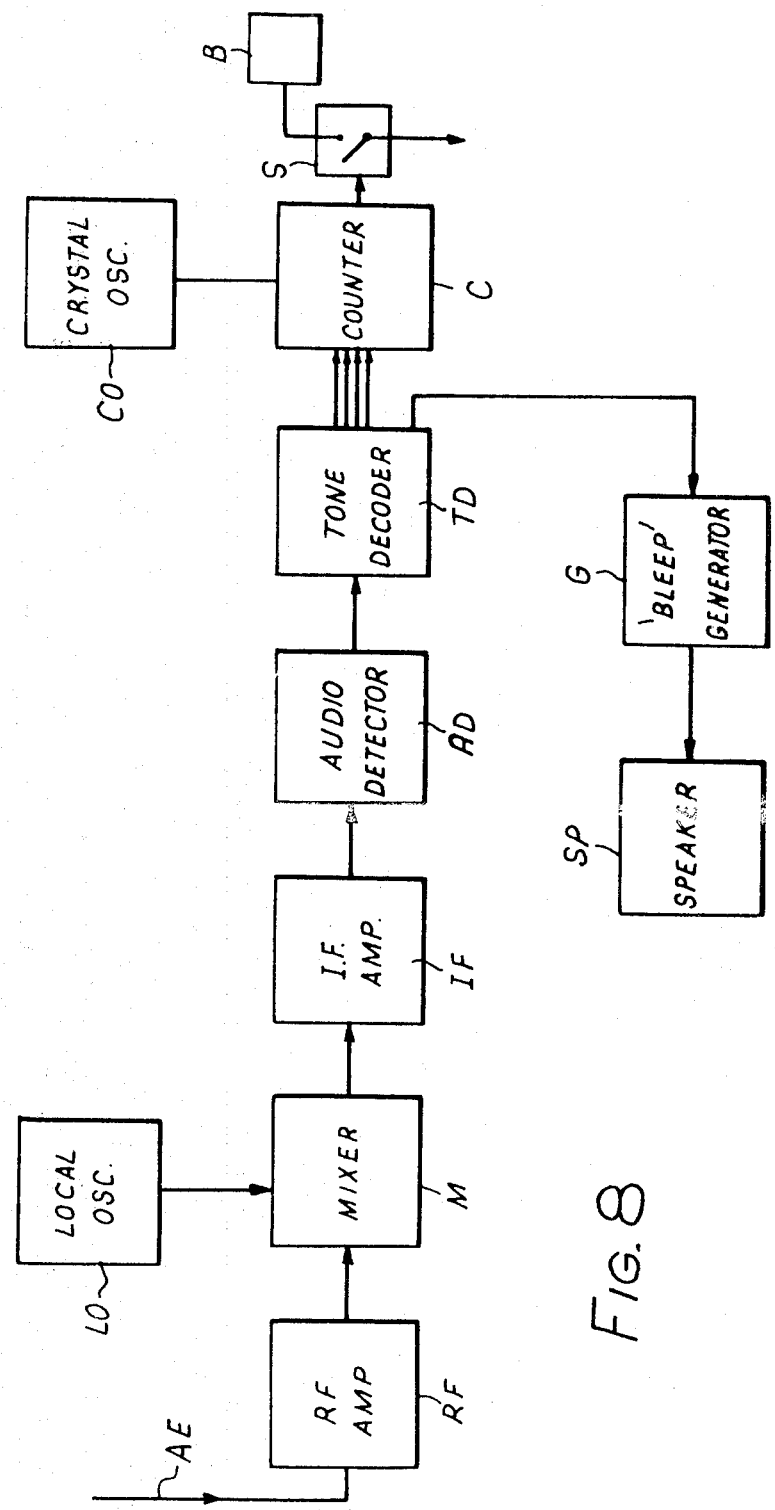
FIG. 8 is a block schematic diagram of a pager according to the invention.

The tone decoder element in FIG. 8 is disclosed in copending British application No. 42,202/78 and is capable of detecting and identifying a periodic component in an incoming electrical signal which has a frequency equal to any one of 16 predetermined frequencies in the range of audio frequencies from 500 Hz to 3 KHz. The tone decoder is capable of detecting such a component in the presence of high noise levels, for example, a signal-noise ratio of 0 dB.

FIG. 8 shows a pocket radio receiver, known as a pager, which is used in a radio communication system wherein a controller at a central station is able to establish radio contact with a series of remote users. Each user is provided with a pager for detecting a coded address signal transmitted from a central station. The address signal consists of a sequence of two or more tone signals modulating a radio frequency, each tone signal consisting of a signal at an audio frequency different from the frequency of the or each adjacent tone signal. Upon detecting the coded address signal associated therewith, a pager generates an audio signal in the form of a "bleep" which advises the user that he should contact the central station, by telephone, for example. Alternatively, a spoken message may follow the "bleep".

To avoid the need for maintaining radio frequency detection circuits continuously in a condition suitable for receiving an incoming address signal, the device is also sensitive to a series of predetermined coded command signals transmitted after an address signal. Upon receiving a command signal the battery is disconnected from the detector circuits for an interval of time determined by the coded command signal.

At the input to the present device there is an aerial AE for receiving incoming radio signals and an R.F. amplifier RF for amplifying the signals. An output of the R.F. amplifier RF is coupled to a mixer M which receives a further input from a local oscillator LO. The output of the mixer M is coupled to an intermediate frequency amplifier IF which is connected in turn to an audio detector AD. Connected to an output of the audio detector AD is a tone decoder TD, which is a frequency sensing device corresponding to the device disclosed in our co-pending application no. 42202/78 of even date. An output latch of the tone decoder TD is connected via four output lines to a programmable down counter C, which has a further input connected to a crystal oscillator CO. A control input to a switch S which connects a battery B to the tone decoder TD, audio detector AD and R.F. and intermediate frequency amplifiers RF and IF, respectively, is connected to an output of the control C. A further output from the tone decoder TD is connected to a "bleep" tone generator G whose output is connected to a speaker SP.

Figure 1:
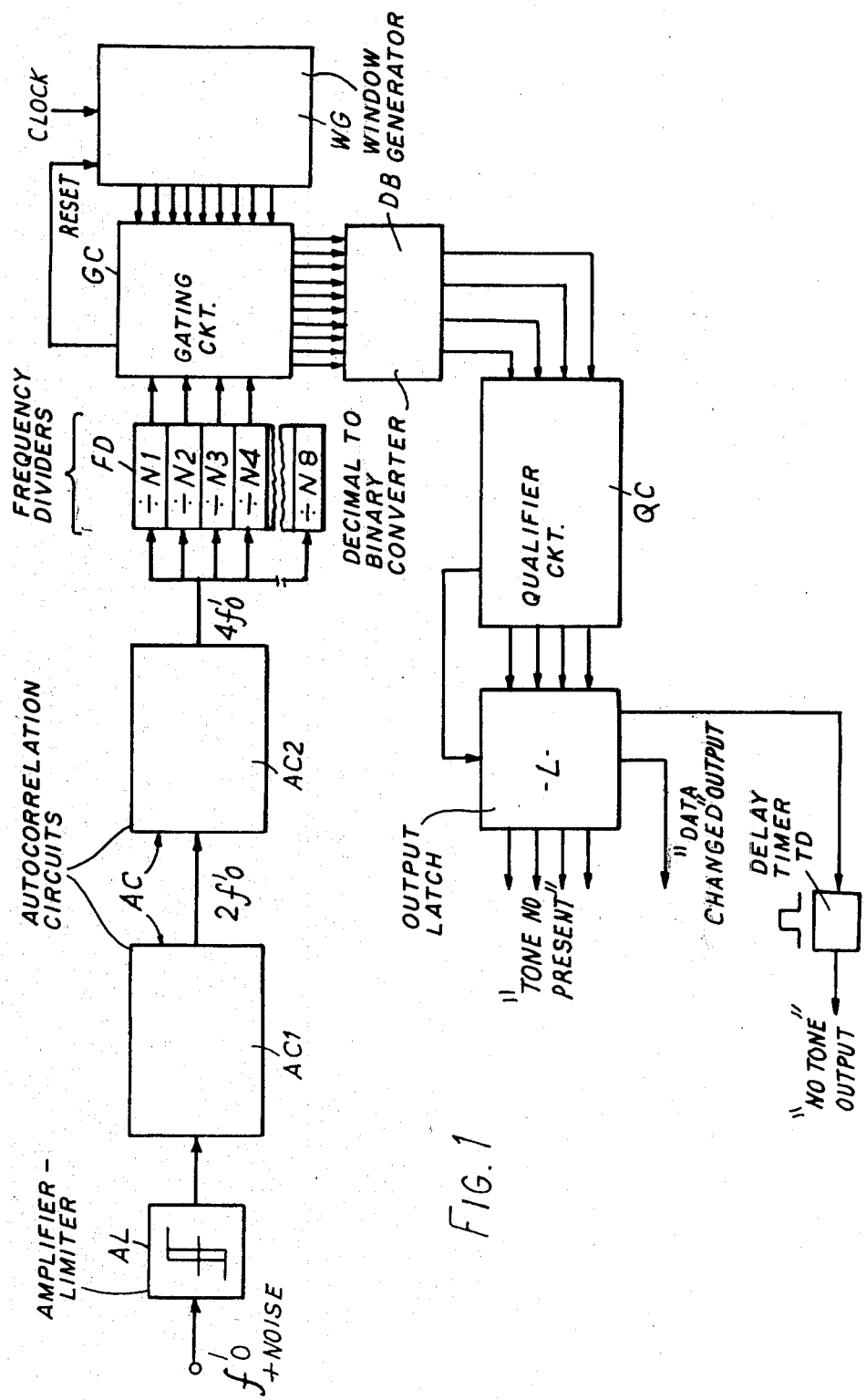

Referring to FIG. 1, the tone decoder includes first an amplifier-limiter AL for generating logic signals which represent successive values in time of the polarity of the incoming signal. Autocorrelation means AC are arranged to process the logic signals and to produce an autocorrelated signal having a periodic component whose period equals one quarter of the period of any periodic component in the incoming signal. The autocorrelated signal includes substantially less non-periodic components than the incoming signal. At the output of the autocorrelation means AC are frequency dividers FD which produce a series of signals, each having a period equal to a predetermined multiple of the period of the periodic component in the autocorrelated signal.

A window generator WG is arranged to provide a series of sixteen window signals each of which defines an interval of time representing a predetermined range of periods.

The outputs from the frequency dividers FD and the window generator WG are connected to a gating circuit GC which compares the period of each signal from the frequency dividers FD with the range of periods represented by an associated window signal and produces an output signal if there is a correspondence between any pair of associated signals. A decimal-binary converter DB is provided for converting output signals from the gating circuit GC into binary form.

At the output of the decimal-binary converter DB is a qualifier circuit QC which examines the signals derived from the gating circuit GC. The qualifier QC is designed to generate an output only if eleven of eighteen immediately preceding signals from the gating circuit GC each represent a correspondence between the same pair of associated signals.

Figure 2:
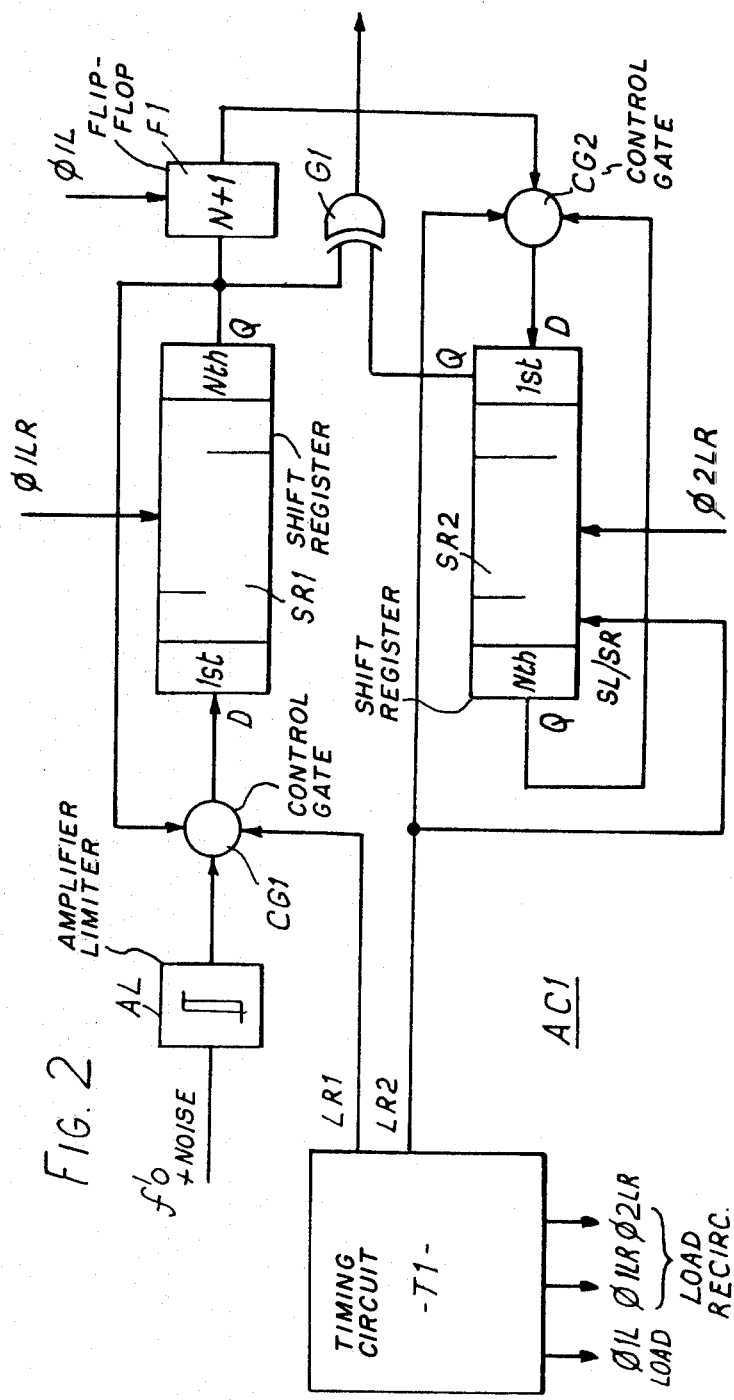

In more detail, and referring to FIGS. 1 and 2, the circuit AL at the input to the tone decoder is an amplifier-limiter formed by a Schmitt trigger circuit. The circuit produces a sample signal which has square wave form and an amplitude which assumes one of two predetermined logic levels, according to the amplitude and polarity of an incoming signal.

Connected to the output of the amplifier-limiter AL is a first autocorrelation circuit AC1 made up of an autocorrelator and a digital Schmitt trigger output circuit. This first autocorrelation circuit AC1, which is shown in more detail in FIG. 2, converts a periodic component in an incoming signal into a component of frequency equal to twice the frequency of the incoming component. There is also a substantial reduction in the noise level.

At the input to the first autocorrelation circuit AC1 there is a first control gate CG1 which has an input connected to the output of the amplifier-limiter AL and an output connected to a first stage of a 40-stage shift register SR1. An output of a final stage in this first register SR1 is connected via a "carry" flip-flop F1 and a second control gate CG2 to a first stage in a second 40-stage register SR2, which is a reversible shift register.

As hereinafter described, autocorrelation involves making a series of comparisons, in each of which each bit of information in one of the registers SR1 and SR2 is compared with a corresponding bit in the other register. One series of comparisons is made in the interval of time between the entry of a fresh bit into the first register SR1 and the transfer of a bit from the final stage to the "carry" flip-flop F1 and the subsequent transfer of the bit from the "carry" flipflop F1 to the second register SR2. Another series of comparisons takes place in the interval of time between a bit being transferred from the "carry" flip-flop F1 to the second register SR2 and the subsequent application of a fresh bit to the first register SR1. To make the comparisons a multiplexing operation is performed. In this multiplexing operation all of the bits in each of the registers SR1 and SR2 are recirculated and two corresponding bits are compared when they are located in the final stage of the first register SR1 and the first stage of the second register SR2, respectively.

To enable the comparisons to be made, the output of the final stage in the first register SR1 and the output of the first stage in the second register SR2 are connected to respective inputs of an exclusive/OR gate G1. Additionally, the output of the final stage in the first register SR1 is connected to a second input of the first control gate CG1 and an output of the final stage in the second register SR2 is connected to a second input of the second control gate CG2.

For loading bits into the registers SR1 and SR2, recirculating bits already in the registers, and operating the two control gates CG1 and CG2, the first autocorrelation circuit AC1 is provided with a timing circuit T1. The timing circuit T1 includes a clock pulse generator, frequency dividers and logic circuits (not shown) which supply a series of synchronised output signals to the other parts of the circuit. Three of these output signals are clock signals, $\phi 1$ load ($\phi 1L$), $\phi 1$ load/recirculate ($\phi 1LR$) and $\phi 2$ load/recirculate ($\phi 2LR$), and two are control signals, load/recirculate 1 (LR1) and load/recirculate 2 (LR2).

As hereinafter described, an output of the timing circuit T1 which supplies the clock signal $\phi 1LR$ is connected to a clock input of the first shift register. The signal $\phi 1LR$ consists of a train of pulses, loading pulses for loading bits into the register and, between each successive pair of loading pulses, a series of recirculation pulses for recirculating bits in the register. An output of the timing circuit which supplies the control signal LR1 is connected to the first control gate CG1 which determines whether the connections at the input to the first register SR1 are those required for loading or recirculation. The clock signal $\phi 1L$ is associated with the signal $\phi 1LR$ and consists of pulses for loading bits from the final stage of the first register SR1 into the "carry" flip-flop F1.

An output of the timing circuit which supplies the clock signal $\phi 2LR$ is connected to a clock input of the second register SR2 and supplies loading and recirculation pulses to that register. An output which supplies the control signal LR2 is connected to the second control gate CG2, which determines whether the connections to the second register SR2 are suitable for loading or recirculation, and to a further input to the second register SR2, where the signal LR2 causes the register to operate in the reverse direction during recirculation.

The timing circuit T1 includes inhibiting circuits (not shown) which prevent the generation of a pulse at the output which supplies the clock signal $\phi 2LR$ when a loading pulse is being generated a the output which supplies the signal LR1. Likewise there is no loading or recirculation pulse from the output supplying the signal LR1 and no loading pulse in the signal $\phi 1L$ at the time when there is a loading pulse in the signal $\phi 2LR$.

Referring to FIG. 3, an output of the exclusive/OR gate G1 in the autocorrelation circuit AC1 is connected to the inputs of two 22-stage counters C1 and C2 in a Schmitt trigger output circuit ST1. The counter C1 is designed to count the number of times during each recirculation of bits in the shift registers a logic 1 voltage appears at the output of the exclusive/OR gate G1. The second counter C2 counts the number of logic 0 voltages. An output flip-flop F2 has a "set" input thereof connected to the final stage in the first counter C1 and a "reset" input connected to the final stage in the second counter C2.

An output from the Schmitt trigger output flip-flop F2 in the first autocorrelation circuit AC1 is connected to the input of the second autocorrelation circuit AC2. This second circuit AC2, which is not shown in detail, is similar in construction to the circuit AC1, being made up of an autocorrelator circuit and a Schmitt trigger output circuit. It will be appreciated, however, that since any periodic component in the signal applied to the second autocorrelation circuit AC2 has twice the frequency of a corresponding component in the incoming signal, the frequencies of clock signals and control signals generated in the second autocorrelation circuit AC2 are equal to twice the frequencies of corresponding signals in the first autocorrelation circuit AC1.

Figure 6:
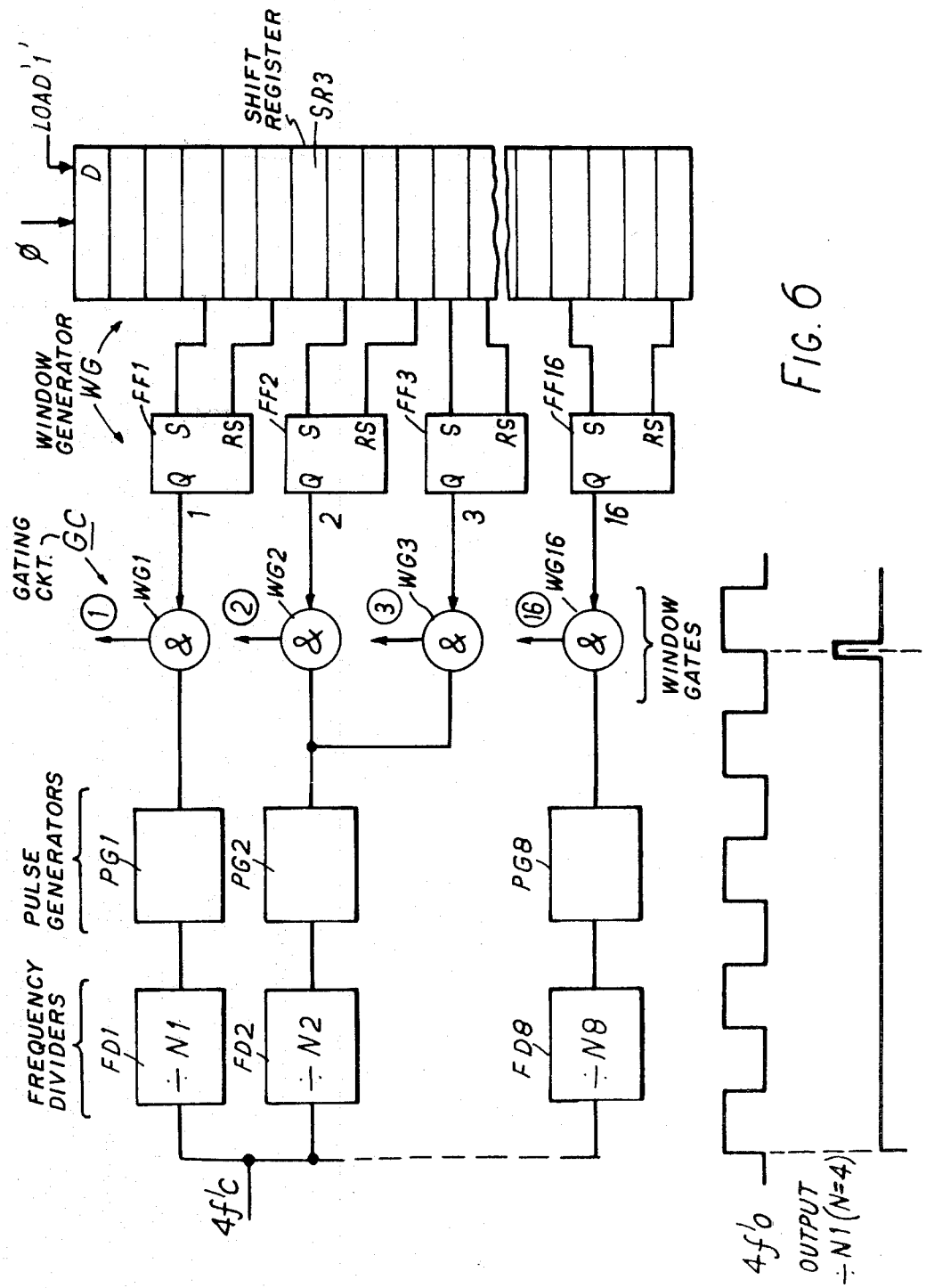

Referring to FIG. 6, the output from the second autocorrelation circuit AC2 is connected to the inputs of eight frequency dividers FD1 to FD8 in the circuit FD. Each of the dividers FD1 to FD8 is designed to generate a signal which has the form of a square wave and a frequency equal to a predetermined fraction of the frequency of a signal supplied thereto from the second autocorrelation circuit. As mentioned above, the circuit is intended to detect incoming periodic signals, whose frequencies range from 500 Hz to 3 KHz. Such incoming signals result in signals of frequency from 2 KHz to 12 KHz at the output of the second autocorrelation circuit. The frequency dividers FD1 to FD8 are arranged to divide the frequencies of signals applied thereto by factors which vary from 4 to 24. This means that for any incoming signal within the above range of incoming frequencies there will be an output from at least one of the dividers FD1 to FD8 which has a frequency of approximately 500 Hz, i.e., a period of approximately 2 ms.

Each of the eight frequency dividers FD1 to FD8 has its output coupled to a respective one of eight pulse generators PG1 to PG8, which is designed to generate a short positive-going pulse at the end of a cycle of the output signal from the associated divider.

The outputs of the eight pulse generators PG1 to PG8 are connected to a series of sixteen "window" gates WG1 to WG16 in the gating circuit GC referred to above. Each "window" WG1 to WG16 gate is an AND-gate. In some cases an output of a pulse generator PG1 to PG8 is connected to an input of two or more of the "window" gates WG1 to WG16, in the remaining cases there is a connection from a pulse generator to one "window" gate only.

The "window" generator WG associated with the gating circuit GC includes a shift register SR3 and a series of sixteen flip-flops FF1 to FF16. Each of the flip-flops FF1 to FF16 has a "set" input connected to a predetermined associated stage in the shift register SR3 and a "reset" input connected to a subsequent stage in the register. A Q output of each flip-flop FF1 to FF16 is connected to a second input of a respective one of the sixteen "window" gates WG1 to WG16.

A logic 1 voltage is applied to an input of the first stage in the shift register SR3 of the window generator WG and a clock input to the register is connected to a clock pulse generator (not shown) which is enabled when all of the dividers FD1 to FD8 are commencing an output cycle. This generator applies clock pulses to the register SR3 at a frequency of 96 KHz. Each of the clock pulses causes a single logic 1 bit to be advanced through the register SR3. The stages in the register SR3 which are connected to the "set" and "reset" inputs of the sixteen flip-flops FF1 to FF16 referred to above are so arranged that the time of arrival of the logic 1 bit at the first of the stages is in the ratio 1:1.5 as compared with the time of arrival at the last of the stages.

The outputs of the sixteen "window" gates WG1 to WG16 are connected to respective inputs of the decimal-binary converter DB having four output lines.

Figure 7:
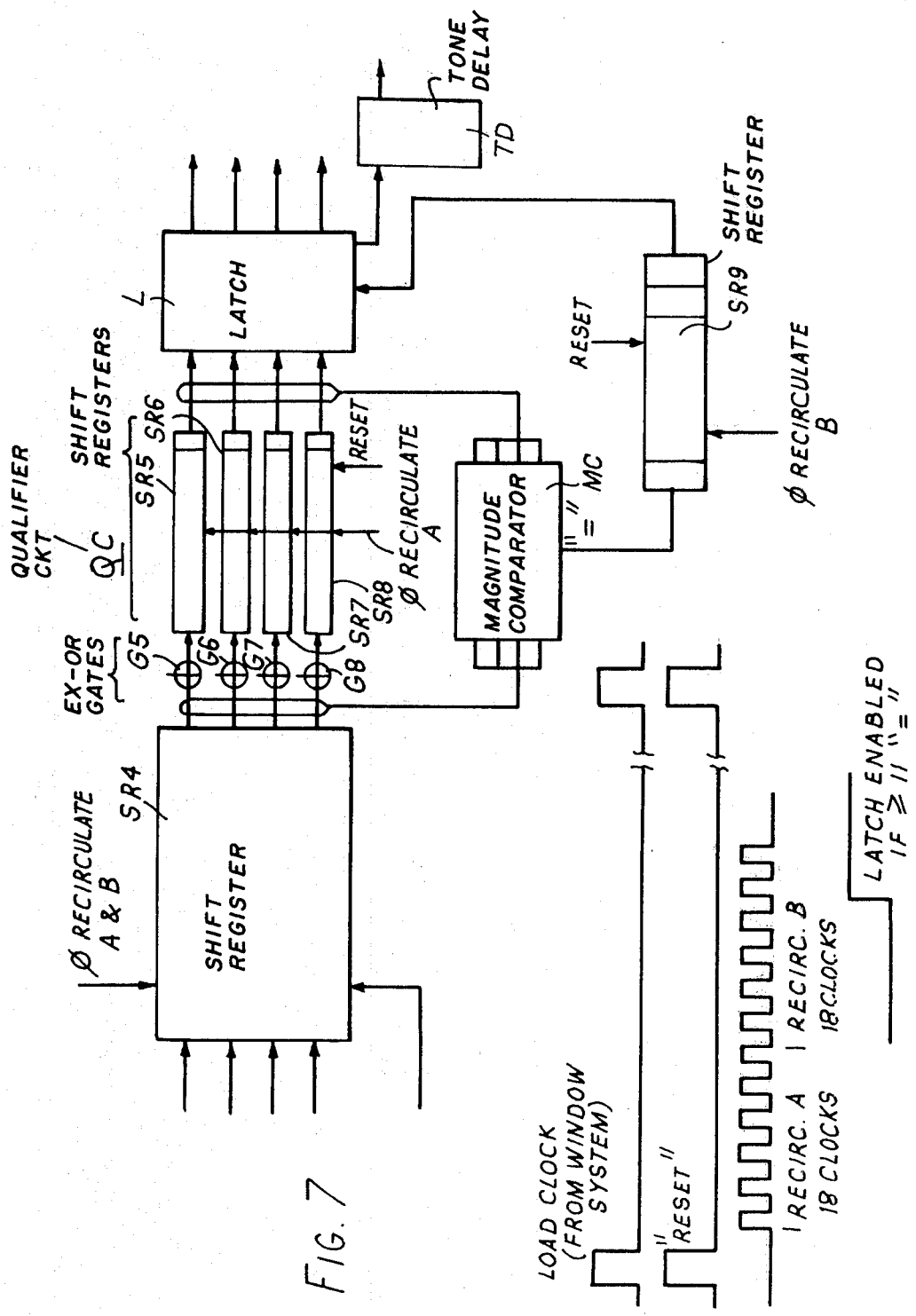

Referring now to FIG. 7, the qualifier circuit QC includes an 18×4 bit shift register SR4 which has its four inputs connected to respective output lines from the decimal-binary converter DB. At the output of the register SR4 are four exclusive/OR gates G5 to G8, each having one input connected to an associated output of the register and a second input which is supplied with a logic 1 voltage. Four 11-bit registers SR5 to SR8 are connected to respective outputs of the exclusive-/OR gates G5 to G8 and an output latch L is connected to the output of the four registers.

As hereinafter described, operation of the qualifier circuit QC involves making a comparison between bits of information as the output of the 18×4 register SR4 and bits at the outputs of the four 11-bit registers SR5 to SR8. The comparison is effected by means of a magnitude comparator MC which has one set of four inputs connected to the 18×4 bit register SR4 and a second set of four inputs connected to the 4×11 bit registers SR5 to SR8. An output of the magnitude comparator MC is connected to a further 11-bit register SR9. Outputs from the latch L are connected to a tone delay TD.

The qualifier circuit QC must be operated in synchronism with the "window" generator WG and clock signals for loading bits of information into the registers SR4 to SR9 and recirculating bits already in the registers are derived from the clock pulse generator referred to above. Included in the clock signals there is first a train of clock pulses for loading a four bit word on the output lines from the decimal-binary converter DB into the 18×4 bit shift register SR4. This first train of pulses is also used for resetting the four 11-bit registers SR5 to SR8. Secondly, there is a train of pulses which are used for recirculating bits in the registers SR4 to SR8. The second train is formed of series of thirty six pulses, there being one series between each successive pair of loading pulses. In each series the first eighteen pulses are used to recirculate bits in the registers SR4 to SR8 whilst the second eighteen pulses are used to recirculate bits in the 18×4 bit register SR4 only. These second eighteen pulses also serve as clock pulses for the final 11-bit register SR9.

When the tone decoder is in use, an incoming electrical signal is applied to the input of the amplifier-limiter AL and a signal of square wave form is produced at the output thereof. As described above, the signal has an amplitude which assumes a first logic level when the incoming signal has a positive polarity and a second logic level when the signal has a negative polarity. As also described, the output of the amplifier limiter AL is connected to the first control gate CG1 in the first autocorrelation circuit AC1.

In the first autocorrelation circuit AC1 each loading pulse in the clock signal $\phi1LR$ for the first shift register SR1 occurs at the same instant in time as an associated loading pulse in the clock signal $\phi1L$ is applied to the "carry" flip-flop F1. Moreover, these loading pulses occur whilst the control signal LR1 has operated the first control gate CG1 so that the output of the amplifier limiter AL is connected to the first stage in the register SR1. Accordingly, each pair of associated loading pulses serves to load a fresh bit, representing the logic level of the output from the amplifier-limiter AL, into the first stage of the register SR1, to advance by one stage the bits already in the register SR1, and to load the bit in the final stage into the "carry" flip-flop F1. Loading is effected at a frequency of 12 KHz.

Each loading pulse in the clock signal $\phi2LR$ applied to the second shift register SR2 occurs whilst the control signal LR2 has operated the second gate CG2 so that the output of the "carry" flip-flop F1 is connected to the first stage of the second register SR2. Accordingly, each loading pulse causes the bit in the "carry" flip-flop F1 to be loaded into the first stage of the second shift register SR2. The loading pulses in the clock signal $\phi2LR$ have a frequency of 12 KHz and each pulse occurs midway between a pair of successive loading pulses in the clock signal $\phi1LR$.

It will be appreciated that clock signals at 12 KHz are sufficient to fully load the first and second shift registers SR1 and SR2, respectively, after a few cycles of a component of an incoming signal of frequency between 500 Hz and 3 KHz.

In the interval of time between each loading pulse in a clock signal $\phi LR1$ or $\phi LR2$ and the next succeeding loading pulse in the other clock signal, there are forty recirculation pulses. During the time when the recirculation pulses are generated the control signals LR1 and LR2 operate the first and second control gates CG1 and CG2, respectively, so that an output from the first stage in each register is connected to an input in the final stage of the register. Moreover, the control signal LR2 actuates the second shift register SR2 so that this register operates in the reverse direction. In the result, all of the bits in each register SR1 and SR2 are recirculated via the associated control gate CG1 or CG2, in the forward direction in the case of the first register SR1 and in the reverse direction for the second register SR2.

FIG. 4 shows diagrammatically the loading of pulses into the registers SR1 and SR2 and the recirculation of pulses in the registers. Also shown are the loading and recirculation pulses.

As described above, an output of the final stage in the first register SR1 and an output of the first stage in the second register SR2 are connected to respective inputs of the exclusive/OR gate G1. This means that immediately after a loading pulse has been applied to one or other registers SR1 and SR2, and before the first recirculation pulse is generated, there are voltages at the inputs to the exclusive/OR gate G1 which correspond to the bits in the final stage of the first register SR1 and the first stage in the second register SR2, respectively. If the two bits are the same, i.e. both are a logic 1 or 0, the output of the gate G1 assumes a logic 1 condition. If one bit is a logic 1 and the other a logic 0, the output of the gate G1 becomes a logic 0.

After the first recirculation pulse the bit in the penultimate stage of the first register SR1 is transferred to the final stage and the bit in the second stage of the second register SR2 is transferred to the first stage. Accordingly, the voltages applied to the exclusive/OR gate G1 now represent bits originally in the penultimate stage of the first register SR1 and the second stage of the second register SR2, respectively. As before, the output of the gate G1 assumes a logic 1 condition if the bits are the same and a logic 0 condition if they are different.

After the second recirculation pulse there is likewise a comparison between the bits originally located in the last stage but two of the first register SR1 and the third stage of the second register SR2, and so on for each recirculation pulse. In the result, the output of the exclusive/OR gate G1 assumes in sequence a series of logic conditions each of which represents a comparison between the bit in one stage of the first register SR1 and the bit in an associated stage in the second register SR2.

A component of an incoming signal having a frequency within the range referred to above is sampled, say, six times per cycle. This means that during each cycle three logic 1 bits (representing a sample during a positive half cycle) followed by three logic 0 bits (representing a sample during a negative half cycle) are loaded into the registers SR1 and SR2.

FIG. 5A shows diagrammatically the situation when bits representing the end of one cycle are at the end of the first register SR1 and bits representing the previous cycle are at the beginning of the second register SR2. For simplicity, it is assumed that each register SR1 and SR2 contains only six stages. The six stages of the first register SR1 and then loaded with the bits 111000 (in a direction from beginning to end of the register) and the first six stages of the second register SR2 are loaded with 111000 (again in a direction from beginning to end of the register). Each of the six stages in the first register SR1 then holds a different bit from that held by the associated stage in the second register SR2 and the recirculation process leads to a series of six logic 0's at the output of the exclusive/OR gate G1.

If a loading pulse in the clock signal $\phi 1LR$ is now applied to the first register SR1 and the clock signal $\phi 1L$ is applied to the "carry" flip-flop F1, the bit in the final stage of the register SR1 is transferred to the flip-flop F1 and the bit in each of the five preceding stages is advanced to the next stage. There is no change in the bits in the second register SR2. In the result, the bits in the six stages of the first register are 011100 (in the direction from beginning to end) and the bits in the six stages of the second register are still 111000 (again in the direction from beginning to end). This situation is shown in FIG. 5B. The recirculation process now gives two logic 1's and four logic 0's at the output of the exclusive/OR gate.

If a loading pulse in the clock signal $\phi LR2$ is now applied to the second register SR2, the bit in the "carry" flip-flop F1 is transferred to the first stage in the second register SR2 whilst the bits in last six stages of the first register SR1 remain the same. As shown in FIG. 5C the bits in the six stages of the first register SR1 are still 011100, the bits in the six stages of the second register SR2 are 01100, and the recirculation process gives four logic 1's and two logic 0's at the output of the exclusive/OR gate G1.

This process is repeated for each loading pulse. For the first six loading pulses, which occupy an interval of time equal to one cycle of the periodic component of incoming signal, it is found that the number of logic 1's in the sequence of logic conditions at the output of the exclusive/OR gate G1 is 246420246420. The resulting output from the gate G1 is shown in FIG. 5F, from which it will be noted that these sums are varying at a frequency equal to twice the frequency of the incoming component.

In practice, as described above, each of the registers SR1 and SR2 in the first autocorrelation circuit AC1 is a 40-bit register and loading pulses are applied to each register at a frequency of 12 KHz. This means that there are 40 individual bits in the first register SR1 each of which is compared with an associated bit in the second register SR2 and a sequence of 40 logic 0's or 1's at the output of the exclusive/OR-gate G1 for each recirculation process.

Each of the counters C1 and C2 in the Schmitt trigger output circuit ST1 is connected to the exclusive/OR gate G1 and commences counting at the beginning of each recirculation process and ends at the end of the process. The first counter C1 is sensitive to logic 1's at the output of the exclusive/OR gate G1 and generates an output if a count of 22 is reached in any recirculation process (i.e. if there is a majority of logic 1's out of the forty logic conditions applied thereto). The second counter C2 is sensitive to logic 0's and generates an output if a count of 22 is reached (i.e. if there is a majority of logic 0's).

As described above for the simplified case, the number of occasions upon which there is a majority of logic 1's, or logic 0's, varies at a frequency equal to twice the frequency of the periodic component of the incoming signal. Accordingly, the set and reset inputs to the flip-flop F2 connected to the twenty-second stage of each counter C1 and C2 are switched at twice the frequency of the component, as is the output of the circuit AC1.

It will be appreciated that a periodic output signal having a frequency equal to twice the frequency of a periodic component of an incoming signal is obtained for all components whose frequency is not too high for there to be less than two loading pulses per cycle. However, no periodic output signal is produced for signals of randomly varying period, i.e. for a noise signal. This means that the output signal from the autocorrelation circuit AC1 described above has a substantially lower noise level than the incoming signal.

The output signal from the first autocorrelation circuit AC1 is applied to the second autocorrelation circuit AC2. It is there subjected to the same treatment as was the incoming signal in the first autocorrelation circuit AC1, except that the frequencies of the clock and control signals employed in the second circuit AC2 are twice as high as those in the first. At the output of the second autocorrelation circuit AC2 there is therefore generated a signal which has a frequency equal to four times the frequency of a periodic component in the incoming signal. The noise level is still further substantially reduced.

The output signal from the second autocorrelation circuit AC2 is applied to the eight frequency dividers FD1 to FD8 which generate signals having frequencies which range from one quarter to one twenty-fourth of the frequency of the signal applied thereto. Each signal from a divider FD1 to FD8 is applied to the associated pulse generator PG1 to PG8, which produces a single positive-going pulse at the end of each cycle of the signal from the divider.

Pulses from each of the pulse generators PG1 to PG8 are applied to the first input of the or each associated window gate WG1 to WG8 in the gating circuit GC described above.

As described above, clock pulses are applied from the clock pulse generator in the window generator WG to the associated shift register SR3 at a frequency of 96 KHz. In addition, a logic 1 voltage is initially applied to an input to the first stage in the register SR3. The clock pulses cause a single logic 1 bit to be advanced through the register SR3 from stage to stage, as also described, and the logic 1 bit appears in those stages connected to set and reset inputs of the associated flip-flops FF1 to FF16 at predetermined intervals of time after the first clock pulse in a train. The interval of time between a logic 1 bit arriving at a stage which is connected to a set input of one of the flip-flops FF1 to FF16 and the same bit arriving at the stage connected to the reset input of the same flip-flop, when measured relative to the beginning of the train, represents a predetermined range of periods, and hence a predetermined range of frequencies.

When a logic 1 appears at a stage of the register SR3 which is connected to a set input of a flip-flop FF1 to FF16 the Q output of the flip-flop assumes a logic 1 condition. The Q output remains in that condition until the logic 1 reaches the stage connected to the reset input to the flip-flop, i.e. for the above-mentioned interval representing a predetermined range of periods or frequencies.

Each of the sixteen window-gates WG1 to WG16 has one input connected to an output of the associated pulse generator PG1 to PG8 and a second input connected to the Q output of the associated flip-flop FF1 to FF16. The output of each of the gates WG1 to WG16 is normally in a logic 0 condition but is switched on a logic 1 condition if there is a pulse at the first input to the gate during the interval of time for which there is a logic 1 applied to its second input, i.e. if the frequency of the pulse from the associated pulse generator PG1 to PG8 is within the range of frequencies associated with the gate and the flip-flop FF1 to FF16 and the stage of the register SR3 connected thereto. After a logic 1 bit has been transferred from the final stage of the register SR3 or a logic 1 bit appears at the output of a window gate WG1 to WG16, the register is reset and the outputs of the dividers FD1 to FD8 are reset. At the beginning of the next cycle of the output from the second autocorrelation circuit AC2, each of the frequency dividers FD1 to FD8 commences another cycle and a fresh logic 1 bit is loaded into the shift register SR3 in the window generator WG.

The outputs of the sixteen window gates WG1 or WG16 are applied to respective inputs of the decimal-binary converter DB and the presence of a logic 1 voltage at any input causes a four-bit binary coded signal representing that input to appear at the four output lines from the converter.

As described above, the four output lines from the decimal-binary converter DB are connected to respective inputs of the 18×4 bit shift register SR4 in the qualifier circuit QC. Each four bit word appearing on the output lines is clocked into the register SR4 by a loading signal derived from the clock pulse generator associated with the shift register SR3 in the window generator WG. After an incoming signal including a periodic component has been applied to the present device for a sufficient time the 18×4 bit register SR4 is loaded with eighteen 4-bit words, each representing a component within one of the predetermined ranges of frequency associated with the window generator WG.

As also described above, the clock signals applied to the qualifier circuit QC also include a train of thirty six recirculation pulses between each loading pulse and the next succeeding loading pulse. The first eighteen recirculation pulses are applied to the 18×4 bit register SR4 and to the 4×11 bit registers SR5 to SR8.

In the case of the 18×4 bit register SR4, the effect of each clock pulse is to transfer the 4-bit word in the final stage of the register to the first stage and to advance the word in each of the other stages to the next succeeding stage. Accordingly, the eighteen words are presented in sequence to the exclusive/OR gates G5 to G8 at the output of the register SR4.

Since a logic 1 voltage is permanently applied to one input of each of the exclusive/OR gates G5 to G8, the application of a logic 1 from the register SR4 to the other input of a gate G5 to G8 causes the output of the gate to assume a logic 1 condition. The application of a logic 0 voltage to the other input causes the output of a gate G5 to G8 to be switched to a logic 0. This means that during the course of the first eighteen clock pulses the eighteen 4-bit words in the 18×4 bit register SR4 which are moved in sequence to the final stage and presented to the exclusive/OR gates G5 to G8 appear sequentially at the output of the gates.

As described above, the output of each exclusive/OR gate G5 to G8 is connected to a respective one of four 11-bit shift registers SR5 to SR8. The clock pulses applied to these registers SR5 to SR8 clock each logic 1 which appears at the output of an exclusive/OR gate G5 to G8 into the associated 11-bit register SR5 to SR8. Accordingly, at the end of the first eighteen recirculation pulses any one of the four registers SR5 to SR8 which has been presented with eleven or more logic 1's, has a logic 1 bit in its final stage. Any of the registers SR5 to SR8 which has received less than eleven logic 1 bits has a logic 0 in its final stage. If the bits in the final stages of the four 11-bit registers SR5 to SR8 are then 1010, for example, the only 4-bit word which can have appeared in eleven or more of the eighteen stages in the 18×4 bit register SR4 is the word 1010. There is no guarantee at this stage of course that there were eleven or more occurrences of this word.

The second eighteen pulses in the train of thirty six recirculation pulses are applied to the 18×4 bit register SR4 only. As before, the pulses cause the eighteen 4-bit words in the register SR4 to appear sequentially at the final stage of the register.

As a word appears at the final stage of the 18×4 bit register SR4 the magnitude comparator MC compares the word with the 4-bit word stored in the final stages of the 4×11 bit registers SR5 to SR8. Each time there is a correspondence between the word appearing in the final stage of the 18×4 bit register SR4 and that stored in the final stage of the 4×11 bit registers SR5 to SR8, a logic 1 voltage appears at the output of the comparator MC and is applied from the comparator to the final 11-bit register SR9. The logic 1 voltages are clocked into the final register SR9 by the second eighteen clock pulses.

In the result, a logic 1 bit arrives at the final stage of the final register SR9 if eleven or more of the comparisons referred to above indicate that a 4-bit word in the 18×4 bit register SR4 is the same as the 4-bit word at the outputs of the 4×11 bit registers SR5 to SR8. This means that at least eleven out of the previous eighteen samplings of the incoming signal have detected a periodic component which has a period corresponding to the same one of the sixteen reference periods defined by the window generator WG.

The presence of a logic 1 at the output of the final register SR9 operates the output of the latch L so that the 4-bit word at the output of the 4×11 bit registers is transferred to the output of the latch. This indicates that an incoming signal having a periodic component within the range of reference periods represented by the 4 bit word has been detected. If less than eleven of the previous eighteen samplings represent a period corresponding to the same reference period, the output of the final register SR9 is a logic 0. The application of this logic 0 to the latch L causes a circuit within the latch to operate the "no-tone" delay timer TD. If the logic 0 persists for a predetermined time, set by the timer, a "no-tone" output appears at the output of the timer. If a logic 1 reappears at the output of the register SR9 before the predetermined time has elapsed, the timer TD is reset. The present device is responsive to coded address and command signals which are described in more detail hereinafter. Briefly, each address signal is formed of a series of five sequential tone signals, each consisting of a signal of predetermined audio frequency. Each tone signal has a frequency which is different from a frequency of the or each tone signal. The five tone signals together form a code which is representative of this particular pager and different from the code associated with any other pager in the system. Each command signal consists of one or more sequential tone signals, each of which can assume any one of, say ten predetermined frequencies.

In operation, radio frequency signals are amplified by the R.F. amplifier RF. Signals from the R.F. amplifier RF are converted to signals of intermediate frequency and amplified in the intermediate frequency amplifier IF and the audio components are then detected in the audio detector AD.

Audio signals from the audio detector AD are applied to the tone decoder TD. As described in the above mentioned application No. 42202/78, the tone decoder TD produces an output representative of an audio signal, provided that the signal persists for sufficient time and has a frequency within one of a series of sixteen predetermined frequency ranges determined by a window generator in the tone decoder TD. The output from the tone decoder TD takes the form of a 4-bit binary word.

Each of the five tone signals making up the address signal is detected by the tone decoder TD and the 4-bit word corresponding to each tone signal is compared with the appropriate number in the address code of the pager, this address code being stored at the output of the decoder. Assuming that each of the five 4-bit words corresponds to the appropriate stored number and these words are not followed by a command signal, the decoder TD generates an output signal which activates the "bleep" tone generator G.

If the five 4-bit words forming an address signal are followed by one or more command signals, the bleep tone generator G is not operated. Instead, the command signal or signals cause a further 4-bit output signal to appear at the output of the tone decoder TD and this signal is applied to the programmable down counter C. An output signal is immediately applied from the counter C to the control input to the battery switch S, and the switch S operates to disconnect the battery B from all components in the device other than the counter C and the crystal oscillator C0. The counter C then counts a number of clock pulses from the crystal oscillator C0 equal to the number represented by the coded command signal, and the battery switch C remains open during this time. For example, a 4-bit output representing the number 1 may cause the counter signal to be applied to the battery switch S for 10 seconds, the number 9 may cause application of the counter signal for 90 seconds, etc.

At the end of the count, the counter signal is removed, the battery switch S closes, and power is again applied to all components in the device.

The central station now transmits a further address signal followed by a message for the user or a command signal to disconnect the battery S for a further period. If no further address signal is received, the battery switch S may remain closed indefinitely. Alternatively, the battery switch S may remain closed for a further predetermined time and then be opened for the time represented by the last command signal received, or the switch may be opened and closed according to a predetermined programme, the ratio of on:off periods increasing with time.

It will be appreciated that the result of this operation is a saving in battery power, the battery B being disconnected from all components other than the counter C and crystal oscillator C0 for a time determined by the command signals and being connected for alternate intervals needed to detect the next succeeding address and command signals. Allowing for timing inaccuracies of the crystal oscillator C0 off:on ratios up to several hundred:1 are realised.

A group of receivers or all of the receivers in a system may have a common address code which, when succeeded by the appropriate command signal, is used in switching off the batteries. This common address code may be different from the individual address code used normally for activating a receiver.

I claim:

1. A battery-powered receiver comprising a tone decoder which is adapted to sense an incoming electromagnetic signal comprising a predetermined coded address signal followed by a coded command signal, the address signal comprising at least two tone signals which are transmitted sequentially and each of which comprises an electromagnetic signal having a frequency different from the frequency of the or each adjacent tone signal and the command signal comprising a tone signal which is an electromagnetic signal which can assume any one of at least two different predetermined frequencies, the tone decoder being adapted, upon sensing the incoming signal, to generate an output signal representative of the coded command signal, timing means, switching means for connection between a battery and other circuits components in the receiver, means coupling the switching means to an output of the timing means, and means for applying the output signal from the decoder to the timing means, whereby the timing means generate an output which is applied to the switching means and causes the switching means to operate to disconnect the battery from at least one of the said circuit components for a predetermined interval of time represented by the coded command signal.

2. A battery-powered receiver in accordance with claim 1, wherein said other circuit components in the receiver comprise receiving means and detecting means.

3. A battery-powered receiver comprising means for receiving an incoming electromagnetic signal which comprises tone signals modulating a signal of radio frequency, means for detecting tone signals in the incoming electromagnetic signal, a tone decoder, means for applying tone signals from the detecting means to the tone decoder, the tone decoder being adapted, upon sensing a predetermined coded address signal followed by a coded command signal, to generate an output signal representative of the coded command signal, the predetermined coded address signal comprising at least two tone signals which are transmitted sequentially and each of which comprises an electromagnetic signal having a frequency different from the frequency of the or each adjacent tone signal and the command signal comprising a tone signal which is an electromagnetic signal which can assume any one of at least two different predetermined frequencies, timing means, switching means for connection between a battery and the receiving means, detecting means and tone decoder, means coupling the switching means to an output of the timing means, and means for applying the output signal from the decoder to the timing means, whereby the timing means generate an output which is applied to the switching means and causes the switching means to operate to disconnect the battery from at least one of the said receiving means, detecting means and decoder for a predetermined interval of time represented by the coded command signal.

* * * * *